Jan. 11, 1938.   F. M. CLARK   2,105,406
LIQUID INSULATING COMPOSITION
Filed May 25, 1935
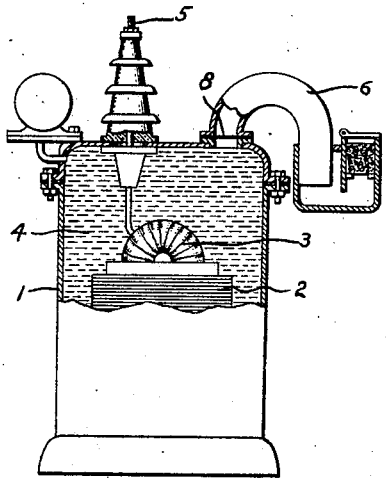
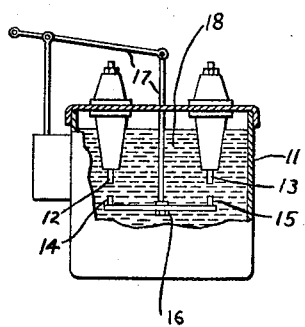
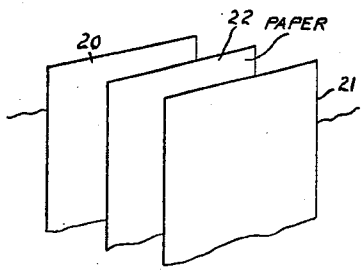
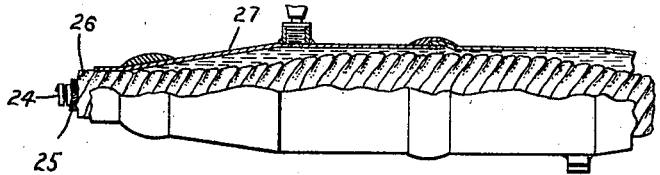
Inventor:
Frank M. Clark,
by Harry E. Dunham
His Attorney.

Patented Jan. 11, 1938

2,105,406

UNITED STATES PATENT OFFICE 2,105,406

LIQUID INSULATING COMPOSITION

Frank M. Clark, Pittsfield, Mass., assignor to General Electric Company, a corporation of New York Application May 25, 1935, Serial No. 23,403

11 Claims. (Cl. 252—1)

The present invention comprises improved dielectric compositions of the type described in my prior Patents 1,931,373 and 1,931,455, patented October 17, 1933 and which comprise halogenated aryl compounds for use as dielectric and insulating materials in electric devices. It is the object of my present invention to further improve the characteristics of such compositions.

Halogenated aryl compounds have been found to be chemically stable, no appreciable decomposition occurring under ordinary conditions even when such compounds are in direct contact with a metal. However, it has been found that when such compounds are in direct contact with an electric arc that some decomposition occurs accompanied by the evolution of hydrogen halide, as for example hydrogen chloride in the case of chlorinated compounds. In devices such as electric transformers in which arcing occurs only under exceptional and abnormal conditions the possibility of decomposition of chlorinated aryl hydrocarbon compounds is not a particularly troublesome contingency. However, in some electric devices, as for example electric circuit breakers, in which arcing occurs incidental to their normal operation the evolution of halogen halide presents a serious handicap to the use of such compositions. While hydrogen halide in any case is an undesirable compound to have in contact with electrical apparatus it is particularly deleterious in the presence of moisture. For example, when moisture is present the hydrogen halide tends to become emulsified in the hydrocarbon composition. It decreases the dielectric strength of the composition in which it is present and may cause damage as by corrosion of metal parts of apparatus in which such composition is used.

It is the object of my present invention to render such hydrogen halide decomposition products innocuous. In accordance with my invention halogenated hydrocarbon dielectric and insulating compositions are mixed with a fixative which is miscible with such hydrocarbon and which is capable of combining with hydrogen halide and perhaps other decomposition products, to form a material which is non-corrosive in the electrical devices or wherever such hydrocarbon compounds may be used.

Preferred fixatives capable of use in accordance with my invention are organic compounds of the class known as nitriles, such as benzyl cyanide, and such compounds may be used either in the unhalogenated or in the halogenated state. Various other fixatives may be used as will be later explained, as for example amino compounds and unsaturated hydrocarbon compounds.

The accompanying drawing illustrates somewhat conventionally different forms of electrical device in which compositions embodying my present invention may be employed for dielectric and insulating purposes. Fig. 1 is a side elevation partly in section of a transformer; Fig. 2 similarly illustrates a switch; Fig. 3 diagrammatically illustrates a capacitor; and Fig. 4 is a side view of a short section of cable, the casing being shown in part removed to permit interior parts to be seen.

Benzyl cyanide for use in accordance with my invention may be suitably prepared in accordance with numerous well known methods, for example from benzyl chloride and potassium cyanide.

Halogenated benzyl cyanide may be made by the chemical interaction of a halogenated benzyl halide, an alcohol and a cyanide. In the following example the halogen element is represented by chlorine and the ingredients employed are chosen for the preparation of trichlor benzyl cyanide. Halogens other than chlorine may be substituted.

Chlorinated benzyl chloride can be obtained by various chemical methods. For example, toluene, $C_6H_5CH_3$, can be chlorinated in the presence of an iron catalyst at temperatures of the order of 25 to 50° C., thereby introducing chlorine in the phenyl or ring part of the toluene. The $CH_3$ side chain may be chlorinated in the presence of sulphur at a higher temperature (140 to 150° C.).

The following mixture is heated to a reaction temperature, preferably while being agitated:

| | Parts by weight |
|---|---|
| Technical mixture of trichlor benzyl chloride isomers | 40 |
| Ethyl alcohol | 50 |
| Potassium cyanide | 13 |
| Water | 12 |

The reaction requires about twelve hours. The desired product is obtained by distillation followed by washing to remove undesired contaminations and in general purified by well-known refining methods. The liquid product obtained by the reaction of the above ingredients is a mixture of isomers of trichlor benzyl cyanide.

The chlorinated benzyl cyanide isomeric mixture is a clear liquid, having a specific gravity at 15.5° C. (referred to water at the same temperature) of 1.53, which boils in the range of 185 to 215° C. at a pressure of about 25 millimeters of mercury. Its refractive index at 25° C. is 1.5850. Its electrical resistivity and dielectric constant are high, the latter being in the neighborhood of 20. It has a pour point of about minus 30° C. (determined by A. S. T. M. test procedure D97-27T) and a viscosity of about 47 seconds at 37.8° C. Saybolt Universal.

Its outstanding useful property here under consideration is its affinity for hydrogen chloride, no solid precipitate being formed and no deleterious or poisonous gases being evolved. It has been found that a volume of hydrogen chloride gas can be absorbed by an equal volume of trichlor benzyl cyanide in twenty-four hours on standing in contact at room temperature. Apparently a harmless addition product is formed which dissolves in the composition.

As above indicated, trichlor benzyl cyanide may be compounded with one or more other liquid dielectric materials, such for example as chlorinated diphenyl, trichlor benzene, chlorinated diphenyl oxide, chlorinated naphthalene, chlorinated diphenyl methane, and others. For example, chlorinated diphenyl of 60% chlorine content is extremely viscous at room temperature, having a pour point of about 30° C. (A. S. T. M. standard). Mixtures may be prepared of such diphenyl and the above described cyanide having lower pour points and lower viscosities as indicated below:

| Per cent chlordiphenyl (60% chlorine content) | Per cent trichlor— benzyl cyanide | Pour point | Viscosity Saybolt at 37.8° C. |
|---|---|---|---|
| | | °C. | Seconds |
| 75 | 25 | +2 | 740 |
| 50 | 50 | −10 | 123 |
| 25 | 75 | −27 | 65 |

Other benzyl cyanides may be used admixed with halogenated dielectric compositions in accordance with my invention. Benzyl cyanide compounds combined with bromine, iodine, or fluorine may be used. While trichlor benzyl cyanide is a preferred fixative for the purposes of my invention, tetrachlor, monochlor, or dichlor compounds may be used. Technical mixtures of any or all of the chlorinated benzyl cyanide may be used.

Tetrachlor benzyl cyanide as a mixture of its isomers may be prepared by a method similar to that described above for the preparation of the trichlor compound. In this case, however, the chlorination of the toluene at 25 to 50° C. in the presence of an iron catalyst is carried to the degree that four chlorine atoms are introduced into the phenyl or ring structure of the toluene.

The tetrachlor benzyl cyanide isomeric mixture is a more viscous liquid of higher pour point than the trichlor compound. It boils at 25 millimeters pressure within the range of 220 to 250° C., has a specific gravity (15.5°/15.5° C.) of 1.58, a viscosity at 37.8° C. of 160 seconds, a pour point (A. S. T. M.) of minus 5° C. and a refractive index of 1.598.

Other nitriles may be used as fixatives in accordance with my invention. For example, lauronitrile, (an aliphatic nitrile), benzonitrile or toluonitrile (aromatic nitriles) and also their chlorinated derivatives may be so used.

Other fixatives capable of use in accordance with my invention are the amino compounds of the benzene, naphthylene, diphenyl or anthracene class, as for example aniline, diamino benzene, naphthylamine, benzidine, or amino anthracene. The hydroxy derivatives of amino compounds, such as amino phenol may be used. Such compounds are referred to as phenyl amino compounds. They may be used as unchlorinated amino compounds, or as the chlorinated derivatives of the amino compounds.

Chemically unsaturated compounds may be used, as for example such compounds as are usually classed chemically as terpenes and camphors. Representative compounds of this class are (a) the open chain olefinic tepenes and camphors (isoprene, citronellal, citral, geraniol), (b) monocyclic terpenes and camphors (dipentene, terpinene), (c) complex cyclic terpenes and camphors (pinene). Certain etherial oils consisting chiefly of compounds of this type may be employed in accordance with this invention. Such oils are oil of turpentine, oil of citron, orange oil, and oil of thyme. The unsaturated type of fixative is the subject matter of a divisional application Serial No. 102,985, filed September 24, 1936.

When fixatives, such as herein described, are used in the halogenated aromatic compositions, it is usually sufficient to employ about 1 to 10% of the fixative ingredient, ordinarily 5% being a suitable amount. A materially larger proportion of unhalogenated fixative may impart some degree of inflammability to the otherwise non-inflammable composition. Larger additions may be made when a halogenated fixative, such as a chlorinated benzyl cyanide is used. When the fixative consists of a mixture of equal parts of tetrachlor and trichlor benzyl cyanides, then almost any desired amount may be added as such a mixture is wholly non-inflammable. When the fixative consists of a nitrile of halogen content equal to or greater than the hydrogen content, then any desired amount of fixative may be added. The determining factor is the hydrogen which is given off by these fixatives when decomposed by the electric arc. This hydrogen is entirely eliminated if the fixative compound, or mixture, which is used contains a chemical equivalent of hydrogen and halogen.

In a copending application Serial No. 23,404 filed concurrently herewith, I have described and claimed dielectric materials comprising nitrile compounds and in particular halogenated benzyl cyanide as a new material adapted for insulating and dielectric uses.

The dielectric compositions embodying the present invention may be used in various electrical devices of which four have been shown as illustrative. The transformer shown in Fig. 1 comprises a tank 1, containing a magnetic core 2, and transformer windings 3, these members being surrounded by a liquid composition 4, containing a fixative as herein described. Only one high tension terminal 5 of the transformer windings is visible in the drawing. While the drawing shows also a pressure release conduit 6, such conduit is separated from the main tank 1 by a diaphragm 8 which will only be ruptured under such extraordinary circumstances in which the decomposition of the liquid 4 exceeds the gas-absorbing capability of the fixative in the composition. A solid gas-absorber 9 may be provided in the conduit 6 but ordinarily will not be necessary. No gas release conduit has been shown for the circuit breaker of Fig. 2, which comprises a tank 11, fixed contacts 12, 13, and cooperating movable contacts 14, 15. The latter are mounted on a support 16 which in turn is operatively connected to actuating levers 17. The liquid arc-quenching material 18 embodies the present invention. The capacitor indicated in Fig. 3 comprises armatures or plates 20, 21 and an interposed porous dielectric layer 22 which may consist of paper. The layer 22 is impregnated by a composition made as herein described. The cable of Fig. 4 comprises a core 24, cable conductors 25, insulation 26, which may consist of paper and an external casing 27. The space between the insulated conductors 25 and the casing may contain a liquid composition embodying my present invention.

What I claim as new and desire to secure by Letters Patent of the United States is:

1. A composition of matter comprising as a substantial ingredient a halogenated aromatic hydrocarbon which is liquid at ordinary temperatures, and as a second ingredient a minor proportion of a nitrile fixative material miscible therewith which is capable of forming, by combination with decomposition products of said hydrocarbon, products which are soluble in said hydrocarbon.

2. A composition of matter comprising as substantial ingredients chlorinated diphenyl and a minor proportion of a nitrile fixative miscible therewith which is capable of forming, by combination with hydrogen chloride which may be formed by decomposition of said diphenyl compound, products which are soluble in said hydrocarbon.

3. A composition of matter comprising as substantial ingredients chlorinated aromatic compound and up to about ten per cent a benzyl cyanide.

4. A composition of matter comprising as a preponderant ingredient chlorinated aryl compound which is susceptible of decomposition by an arc and a minor fixative ingredient for halogen hydride resulting from such decomposition, said fixative consisting of a nitrile.

5. A composition of matter comprising as a preponderant ingredient chlorinated aryl composition which is susceptible of decomposition by an arc and a minor ingredient of chlorinated benzyl cyanide.

6. A composition of matter comprising a substantial proportion of a liquid chlorinated diphenyl compound and a substantial proportion of a liquid chlorinated benzyl cyanide, said composition being capable of withstanding direct contact of an electric arc without evolving hydrogen chloride.

7. A composition of matter comprising a substantial proportion of a chlorinated aryl compound which is susceptible to decomposition by an arc and a substantial proportion of isomers of chlorinated benzyl cyanide.

8. An electrical insulating and cooling liquid composition for use in transformers and the like consisting preponderantly of substantial proportions of chlorinated diphenyl and chlorinated benzene and containing chlorinated benzyl cyanide as a minor ingredient.

9. A composition comprising chlorinated diphenyl and chlorinated benzyl cyanide.

10. A composition suitable for dielectric and insulating purposes consisting of chlorinated diphenyl and trichlorbenzyl cyanide, said composition having lower viscosity and lower pour point than said chlorinated diphenyl.

11. A liquid insulating composition comprising the combination of chlorinated diphenyl having a pour point of about 30° C. and a chlorinated benzyl cyanide, said cyanide being present in sufficiently large proportion to cause the flow point of said composition to be materially lower than the flow point of said chlorinated diphenyl.

FRANK M. CLARK.